US005636427A

United States Patent [19]

Lyle

[11] Patent Number: 5,636,427

[45] Date of Patent: Jun. 10, 1997

[54] HAND-HELD SNAP FASTENER CLOSER

[75] Inventor: Michael A. Lyle, Gainesville, Ga.

[73] Assignee: Scovill Fasteners Inc., Clarkesville, Ga.

[21] Appl. No.: 540,069

[22] Filed: Oct. 6, 1995

[51] Int. Cl.[6] .............................. B23P 11/02; A41H 37/04

[52] U.S. Cl. .............................. 29/453; 29/275; 29/254; 227/15; 227/17; 227/33; 227/51

[58] Field of Search .............................. 29/453, 254, 255, 29/275, 243.5; 227/51, 53, 31, 33, 15, 17

[56] References Cited

U.S. PATENT DOCUMENTS

| | | | |
|---|---|---|---|
| 2,177,232 | 10/1939 | Tinnerman | 29/453 |
| 2,854,953 | 10/1958 | Osborne . | |
| 2,963,043 | 12/1960 | Davis et al. | 29/453 |
| 3,181,219 | 5/1965 | Deshaies . | |
| 3,563,438 | 2/1971 | Doyle . | |
| 3,848,322 | 11/1974 | Kuehn et al. | 29/453 |
| 4,096,618 | 6/1978 | Perline et al. . | |
| 4,131,009 | 12/1978 | Hara et al. | 227/53 |
| 4,189,822 | 2/1980 | Perline et al. . | |
| 4,300,282 | 11/1981 | Bunyea et al. | 227/7 |
| 4,403,722 | 9/1983 | Nikolich . | |
| 4,533,075 | 8/1985 | Hallock et al. | 227/53 |
| 4,550,485 | 11/1985 | Killian . | |

*Primary Examiner*—S. Thomas Hughes
*Assistant Examiner*—Tisa L. Stewart
*Attorney, Agent, or Firm*—Dallett Hoopes

[57] ABSTRACT

Closer comprises a cylindrical housing defined by a front end and a rear end, the housing being formed with an axial bore having an enlargement in the front end. An air-driven cylinder is fixedly mounted in the bore and has an axial drive shaft reciprocable therein extending toward the front end and terminating in an impact head normally in an inward position. Reciprocably disposed in the enlargement is an annular trigger loosely surrounding the impact head and normally in an outward position extending down beyond the front end of the housing and movable to an inward position when the housing is lightly depressed over the fastener. An actuator in the housing is moved by the trigger as it approaches its inward position to activate the cylinder and slam the impact head downward to close the fastener. In a modification the cylinder is replaced by a solenoid.

23 Claims, 5 Drawing Sheets

FIG. 1
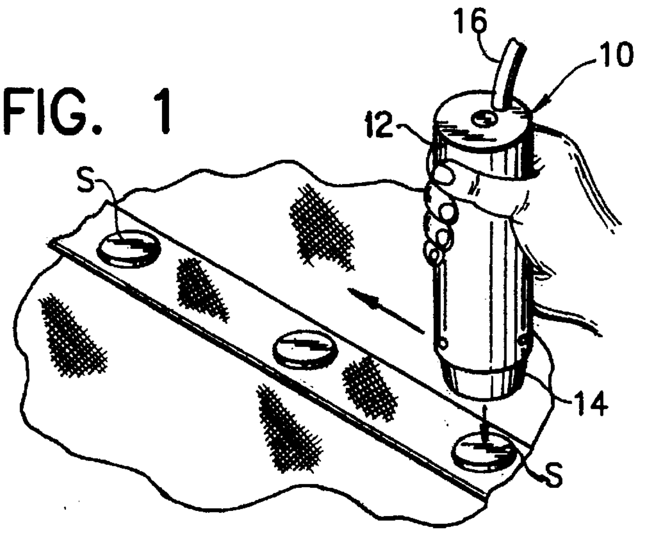
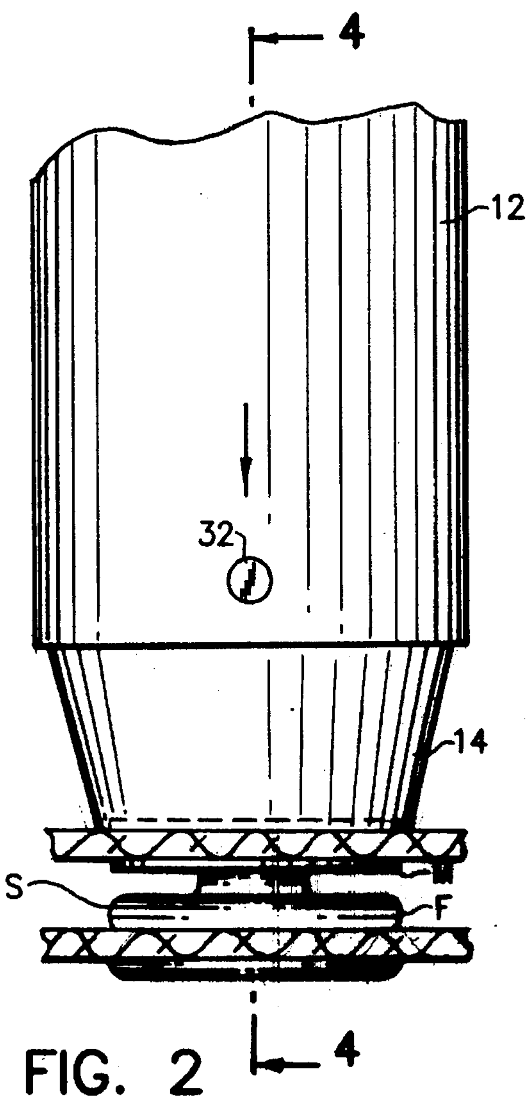
FIG. 2
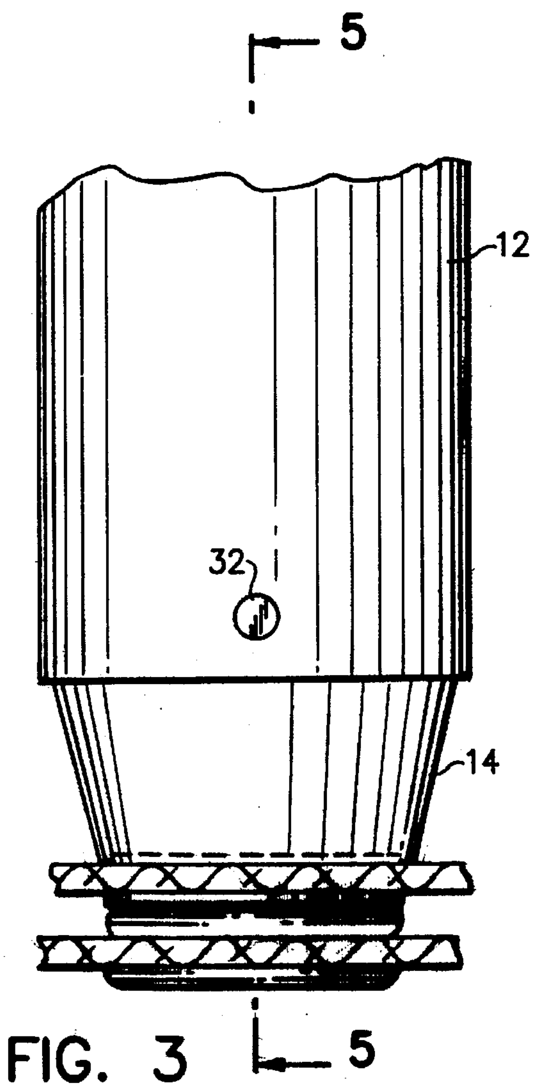
FIG. 3

HAND-HELD SNAP FASTENER CLOSER

FIELD OF THE INVENTION

This invention relates to a hand-held closer for snap fasteners of the type used on garments. More specifically, this invention relates to such a closer which may be powered by compressed air or electrically and which contains a driven reciprocable impact head, the power for driving it being activated by an annular trigger surrounding the head.

BACKGROUND OF THE INVENTION

In a garment factory, once the garment is sewn, it remains the job of the inspector to smooth out the finished garment and overlap the various closable openings such as a shirt front or cuff and to snap closed the snap fasteners therearound.

The inspector is usually seated in front of a large flat table and to close the fasteners, she must exert downward force with her hand against the snap fasteners to snap them. Where the fasteners are at some distance from the edge of the table, the inspector must stand because considerable force is required to snap the fasteners shut. As a result, the closing of the fasteners is a relatively arduous job. This is particularly true where the fasteners are plentiful in each garment as they are with infantswear. For instance, in infant's creepers the openings along the inside of the legs and crotch are closed with as many as a dozen snap fasteners. Still more may run the length of the front opening.

Aside from the arduous and exhausting nature of the closing job, the repeated impact on, for instance, the thumb or wrist of the inspector, can cause repetitive motion fatigue which can lead to chronic pain, etc.

The prior art has been flagrantly unsympathetic to the need for relief to the inspector. There have merely been hand tools for closing fasteners such as are shown in the Perline et al U.S. Pat. No. 4,096,618 issued Jun. 27, 1978 and U.S. Pat. No. 4,189,822 issued Feb. 26, 1980.

Strips of spaced fasteners mounted on tapes have been closed by being drawn between two pressure rolls. This is shown in the Deshaies U.S. Pat. No. 3,181,219 issued May. 4, 1965.

All the while there have been hand-held air-powered machines for applying fasteners, (such as nails) which machines have been triggered by a protruding pressure rod in the front end. This type of machine is shown in the Osborne U.S. Pat. No. 2,854,953 issued Oct. 7, 1958. Yet there has been no satisfactory relief for the garment inspector.

There is a need for such relief. The present invention is directed to this need.

SUMMARY OF THE INVENTION

The invention, therefore, is a hand-held snap fastener closer comprising a cylindrical housing defined by a front end and a rear end, the housing being formed with an axial bore having an enlargement in the front end. An air-driven cylinder is fixedly mounted in the bore and has an axial drive shaft reciprocable therein extending toward the front end and terminating in an impact head normally in an inward position. Reciprocably disposed in the enlargement is an annular trigger loosely surrounding the impact head and normally in an outward position extending down beyond the front end of the housing and movable to an inward position when the housing is lightly depressed over the fastener. An actuator in the housing is moved by the trigger as the trigger approaches its inward position to activate the cylinder and slam the impact head downward to close the fastener.

The invention includes a modification in which the cylinder is replaced by a solenoid.

BRIEF DESCRIPTION OF THE DRAWINGS

Further objects and features of the invention will be apparent to those skilled in the art from a study of the following specification and the accompanying drawings, all of which disclose a non-limiting embodiment of the invention. In the drawings:

FIG. 1 is a perspective view showing the closer of the invention being positioned spaced above one of the fasteners of a shirt front (shown fragmentary), before being lowered to working position;

FIG. 2 is an enlarged fragmentary elevational view, shown before triggering, of the closer engaging a snap fastener;

FIG. 3 is a view similar to FIG. 2 showing the fastener after triggering;

DESCRIPTION OF THE PREFERRED EMBODIMENTS

A closer embodying the invention is shown in FIG. 1 and generally designated 10. It comprises a cylindrical housing 12 and an annular trigger 14. A compressed air line 16 powers the unit.

As shown, the unit is aligned with the snap fastener S, the parts of which are installed on the overlapping margins of a garment opening, such as a shirt front or cuff. The closer is used by aligning it over a fastener S and urging it lightly down with the annular trigger 14 surrounding the fastener. As the closer is lowered, the trigger 14 engages the garment and moves up in the housing and activates the cylinder to slam down the impact head, to be described. This pushes down the upper fastener part snapping it together with the lower fastener part (FIGS. 2 and 3) which is resting on a flat table (not shown). As shown in FIGS. 2 and 3, the upper part may be a head or male part M, and the lower part may be a socket or female part F, the parts having been respectively set into the margins of the garment prior to the present operation.

Figure 4:
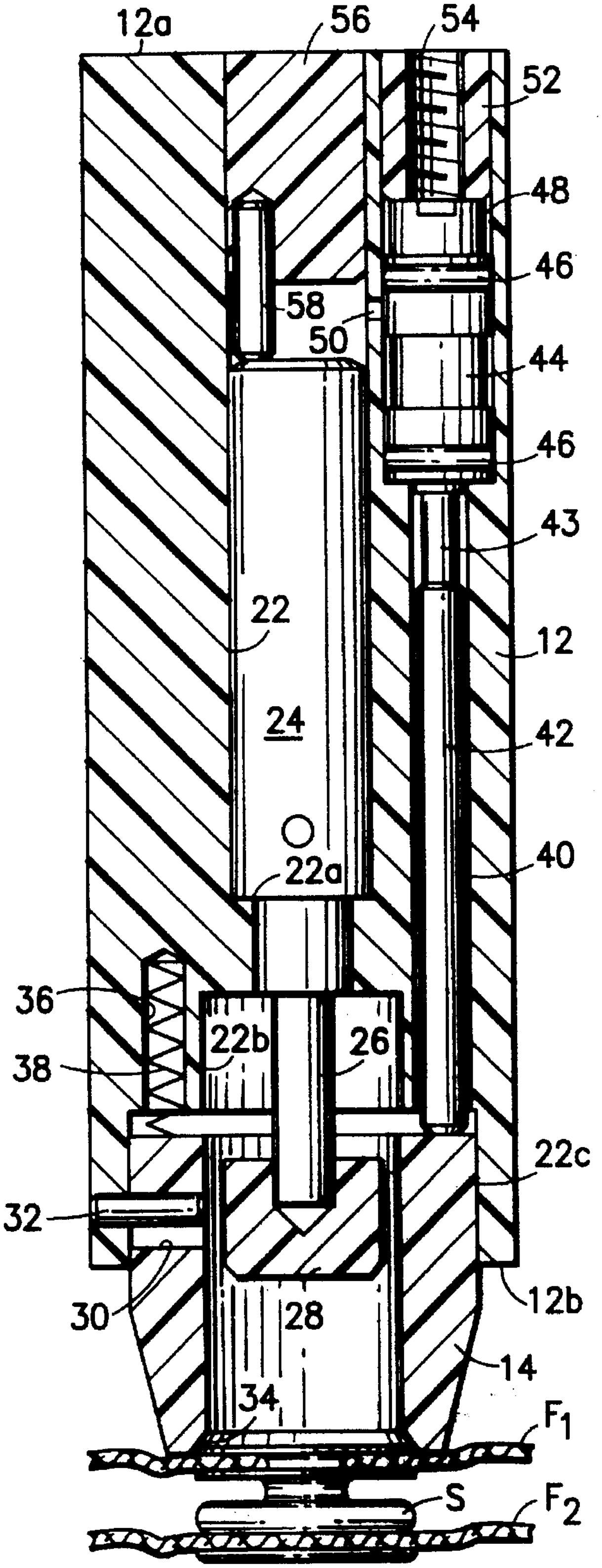
FIG. 4 is a sectional view taken on the line 4—4 of FIG. 2.
Figure 5:
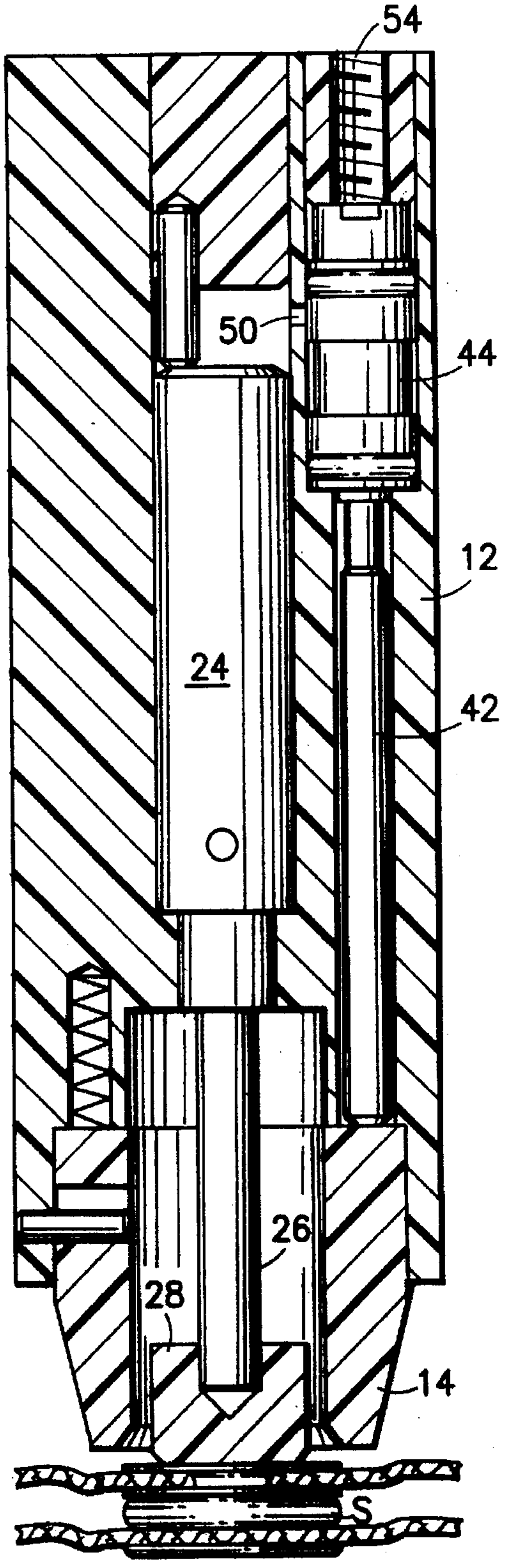
FIG. 5 is a sectional view taken on the line 5—5 of FIG. 3.

As shown in FIGS. 4 and 5, the closer comprises a cylindrical housing 12 which is formed with an axial bore 22 extending from the back end 12*a* to the front end 12*b*. As shown, the bore is reduced in diameter as at 22*a*, enlarged as at 22*b*, and greatly widened in diameter as at 22*c*, all of these diameters being concentric with the axis.

Disposed in the axial bore is the air cylinder 24 having a front end which may extend into the narrow diameter 22*a*. The cylinder may be a Clippard Model B5, available from the Clippard Company of Cincinnati, Ohio. Downward from the front end extends a reciprocable connecting rod 26, to the downward end of which is secured the impact head 28 preferably cylindrical, axial and concentrically mounted. The annular trigger 14 loosely surrounds the head 28, and its upper end is disposed in the enlargement 22*c* for limited reciprocation therein in sliding fit. The trigger is slotted as at 30, and a pin 32 extends through a radial hole in the front end of the cylinder and into the slot to permanently and reciprocably attach the trigger 14 to the housing. The lower end of the trigger 14 may be tapered and the inner edge may be chamfered as at 34.

The housing is longitudinally blind-drilled as at 36 spaced about the axis in a number of locations uniformly. Each of the blind bores created thus receives a spring 38 which biases the trigger 14 out or downward from the housing 12. The housing is further longitudinally bored at 40, spaced from the axis and an activator pin 42 slides therein. The lower end of the pin engages the upper end of the trigger, and the upper end of the pin engages the control pin 43 of an inlet valve unit 44. Unit 44 is equipped with 0-rings 46 to peripherally seal it inside the enlargement 48 of the bore 40.

Valve 44 is commercially available also under the trade name Clippard and includes a spring biasing the piston toward retraction. The valve 44 at its upper end is formed with an inlet opening and a seat (not shown) facing upward. The operating pin 43 is connected to the valve element normally sitting on the seat and when the operating pin is moved upwardly, the valve element raises off its seat to permit a blast of air to pass through the valve into the enlargement 48 between the 0-rings 46 and laterally out through a port 50 in the housing between the enlargement and the central bore 22. In its lower position (FIG. 4) pin 43 is reduced where it enters the valve (not shown) housing 44 and permits venting of the housing through the passage 40, etc. The upper end of the enlarged bore 48 is closed with a plug 52 centrally drilled and tapped at 54 for connection to a threaded air supply (16 in FIG. 1).

The upper end of the axial bore 20 is similarly closed with a cylindrical insert 56 which is provided with a spacer pin 58 extending downward to hold the cylinder 24 in proper position as shown.

The blast of air through port 50 enters the upper end of the cylinder 24 and drives down the piston (not shown) therein to rapidly depress the connecting rod 26 and head 28 to impact on the top of the snap fastener assembly (FIGS. 4 and 5).

The raising of the operating pin in valve 44 is effected by placing the trigger 14 over the fastener S and moving the cylindrical housing 12 downward lightly. This moves the housing and valve 44 down relative to the stationary actuator pin 42 with the effect that the operating pin 44 is driven up relative to the valve 44 to open the valve element off its seat (not shown). It is significant to note that the travel of the impact head is relatively long and, hence, while the entire unit is relatively light, the head 28 develops enough velocity to make an effective impact despite its light weight. This impact is sufficient to snap the snap fastener head and socket into mating engagement.

Once the closing of the snap fastener S is effected, the housing 12 may be raised, dropping the pin 42 relative to the valve 44 to close the valve, relieving the pressure on the cylinder 24 and venting the pressure out the valve housing as described. This permits the internal spring (not shown) to return the piston, connecting rod 26 and impact head 28 upward to the original position shown in FIG. 4.

Modifications

Figure 6:
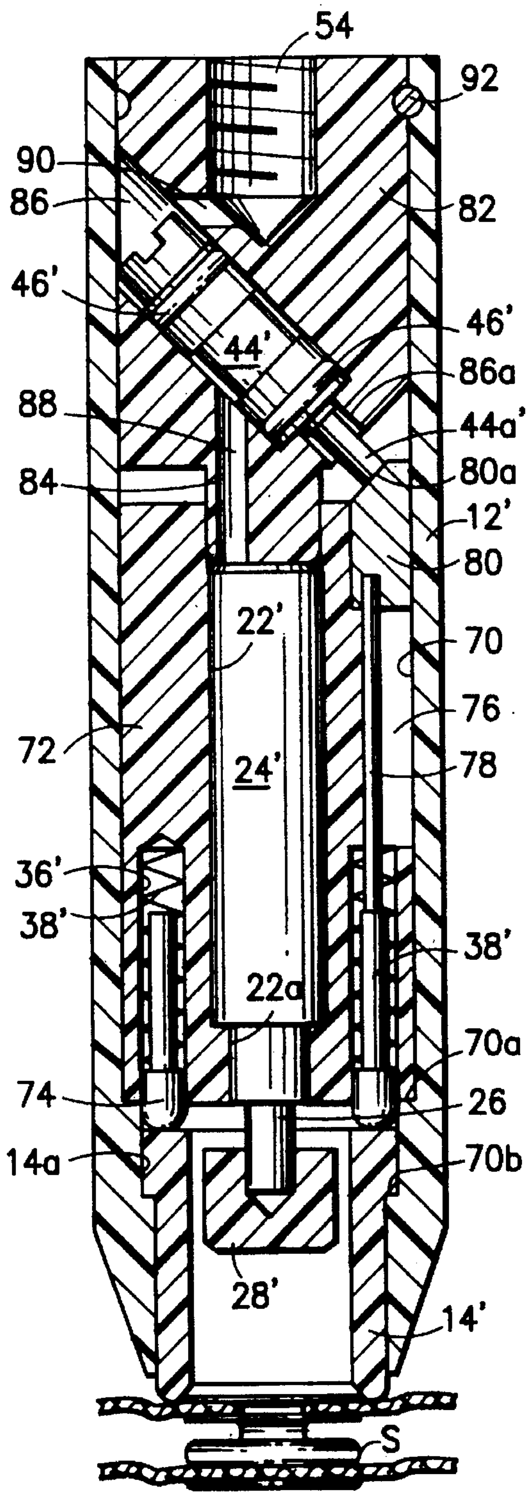
FIG. 6 is a view similar to FIG. 4 of a modified form of the invention.
Figure 7:
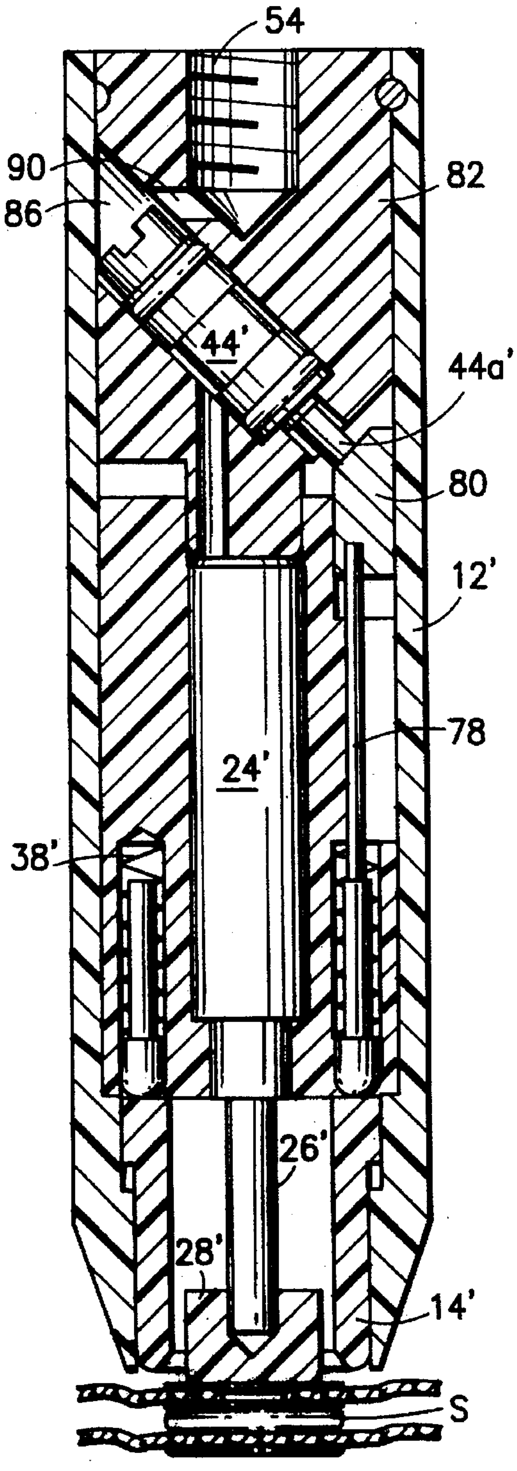
FIG. 7 is a view similar to FIG. 5 of the modified form of the invention.

FIGS. 6 and 7 show modified forms of the closer embodying the invention. For the most part, the primed form of the reference numerals of FIGS. 4 and 5 is used to indicate corresponding parts. Hence, the units are similar with some notable exceptions.

In FIG. 6 the housing may be in the form of a cylindrical shell 12'. The shell is formed with an inner diameter 70 which is stepped in to form a shoulder at 70*a* and again at 70*b* therebelow. In the assembly the trigger 14' is inserted from above into the bore. It is formed with an outward stop flange 14*a* which comes to rest on the shoulder 70*a*. A cylindrical body or cylinder housing 72 is formed with a central bore 22' for receiving a cylinder 24'. The bore 22' is reduced at 22*a*' and forms a shoulder against which the lower end of the cylinder 24' butts. The reduction at 22*a*' receives the front end of the cylinder 24'.

The connecting rod 26' is provided on its lower end with a concentric impact head 28' which operates loosely inside the annular trigger 14'. Outward from the central bore the body 72 is drilled upwardly with a number of blind holes 36'. These each receive an axial spring 38' which centrally receives from below a headed pin 74, the head compressively engaging the lower end of the spring 38! and resting against the retaining flange 14*a* of the annular trigger 14' to bias the trigger down.

The body 72 is longitudinally slotted as at 76 and an extension 78 of the pin 38' shown on the right side of FIG. 6 extends upward in sliding fit and is capped by an actuator block 80 reciprocable in its slot defined by an opening at the top of the bore and the wall of the shell 12'. By means of this structure, when the trigger 14' moves upward relative to the shell 12', the block 80 driven by the actuator pin 78 moves upward also. It is normally returned downward by the spring surrounding its pin 38' as the trigger lowers.

The upper end of the shell 12' is sealingly plugged by a cylindrical valve housing 82 sealingly disposed in the housing and formed at its lower end with a reduced neck 84 which fits into and plugs the axial bore 22' of the body 72 and holds the cylinder 24' properly down against its shoulder. The insert 82 is formed with a canted bore 86 which receives snugly the valve 44' surrounded by 0-rings 46'. The valve 44' is provided with an operating pin 44*a*' which butts against the beveled face 80*a* of the block 80, the canted bore 86 being reduced at 86*a* to form a shoulder against which the valve butts.

A passage 88 is formed in the valve housing 82 connecting the canted bore 86 and the cylinder 24', and the insert is formed with a threaded connector bore 54' in axial disposition. The lower end of the bore 54' is formed with a lateral passage 90 into the canted bore 86. A pin 92 holds the insert 82 securely in position.

The structure of the valve 44' is as described in connection with the valve 44 and is opened when the plug 80, urged upward by trigger 14', slidingly engages the operating pin 44*a*' to depress it relative to the valve 44' This opens the valve element off its seat (not shown) and permits air to move from the passage 90 into the valve 44 and down passage 88 to activate the piston within the cylinder 24' In turn, this slams down the impact head 28' With the long travel of the head 28' heretofore described, the impact is sufficient to snap closed the fastener S. Thus, with the trigger 14' placed over the fastener S and depressed, there is effected through the instrumentality of the pin 78, block 80, valve 44' and cylinder 24' the slamming down of the impact head 28' and closing of the fastener S.

Figure 8:
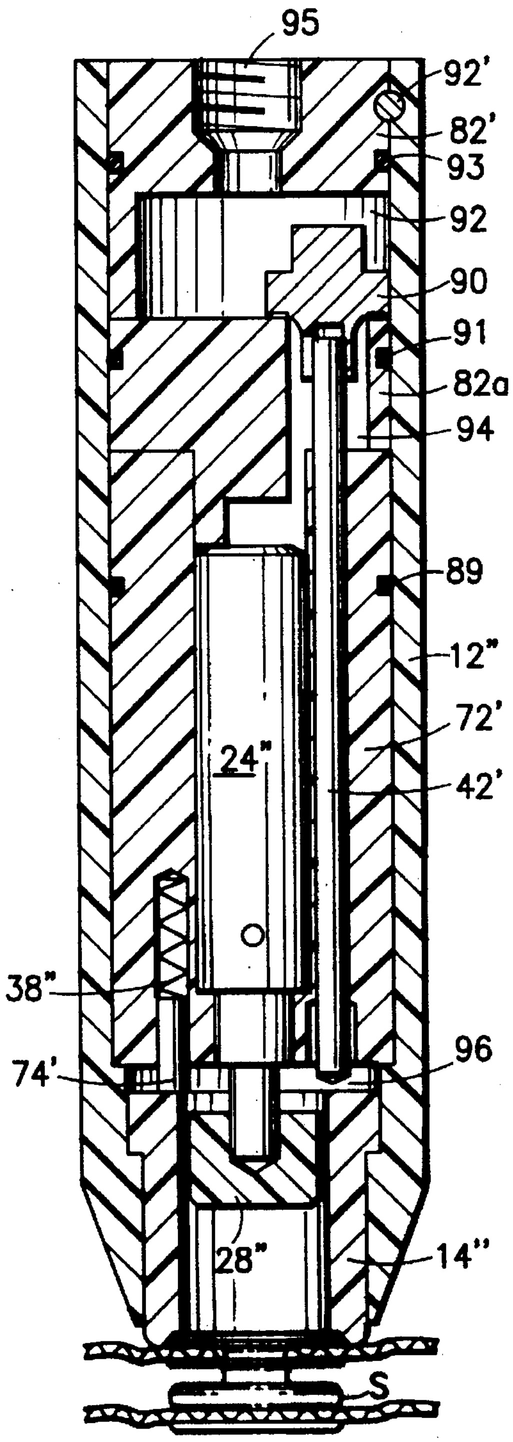
FIG. 8 is a similar view to FIG. 4 of another modified form of the invention.

In the FIG. 8, 9 modification the shell 12" is loaded with a cylinder housing 72' in which is held the cylinder 24" driving the impact head 28". The cylinder housing 72' is sealed in the shell 12" by an 0-ring 89. Superposed and interfitting with the cylinder housing 72' is the valve housing 82*a* also sealed in the shell by an 0-ring 91. Finally, an end plug 82' is stacked above the valve housing 82*a* and is in turn sealed to the shell by 0-ring 93.

The activator rod 42' is reciprocable in the bore running through the cylinder housing 72' and is formed with a tip 96 on its lower end which engages the annular trigger 14" The upper end of the activator rod 42' is formed with a valve head 90 having an annular valving gasket in its lower end. The end plug 82' is provided with a tapped bore 95 for receiving an air supply. It opens into a valve chamber 92 which, when the valve is open, communicates with the passage 94 in the valve housing 82*a*. This passage communicates in turn to the rear end of the cylinder 24".

Figure 9:
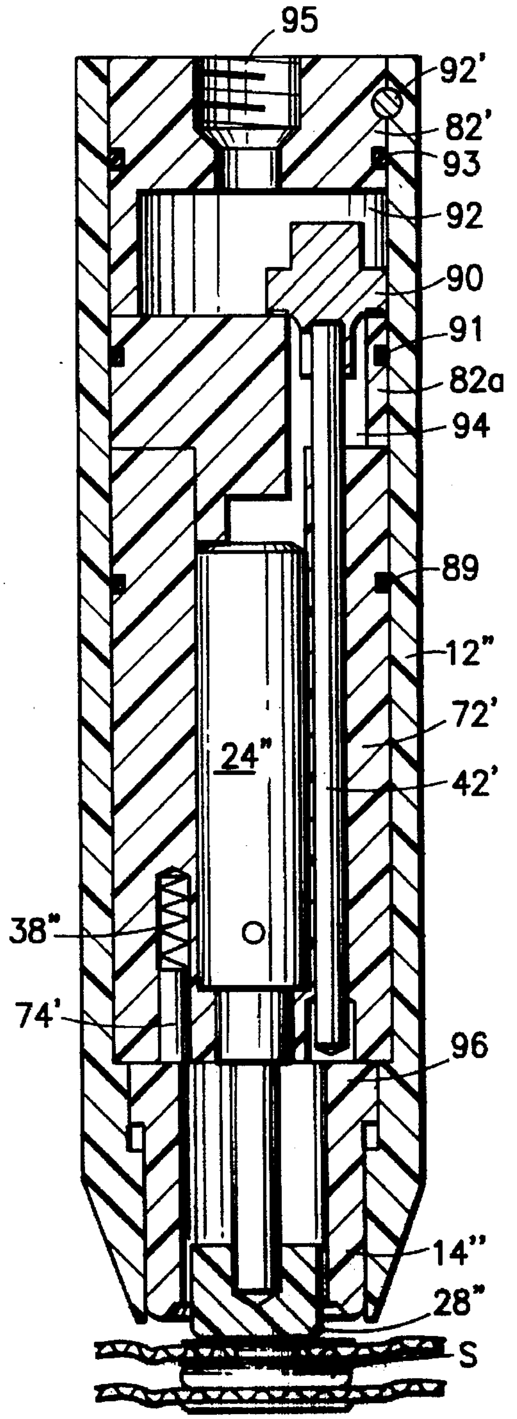
FIG. 9 is a view similar to FIG. 5 of the other modified form of the invention.

As a result, when the trigger 14" is raised in the shell 12" (FIG. 9) as the unit is lowered about a fastener, the activator rod 42' raises the valve head 90, permitting air to rush into the rear end of the cylinder 24' to drive the impact head 28" downward. Upon release, the spring 38" moves the trigger downward (FIG. 8) to the position shown. Air pressure working on the upper faces of the valve head 90 force it to seat, closing off the passage 94. Subsequently, air in the cylinder 24" vents through the passage surrounding rod 42, and a spring within the cylinder returns the piston (not shown) and the impact head 28" to the position shown in FIG. 8.

Further Modification

Figure 10:
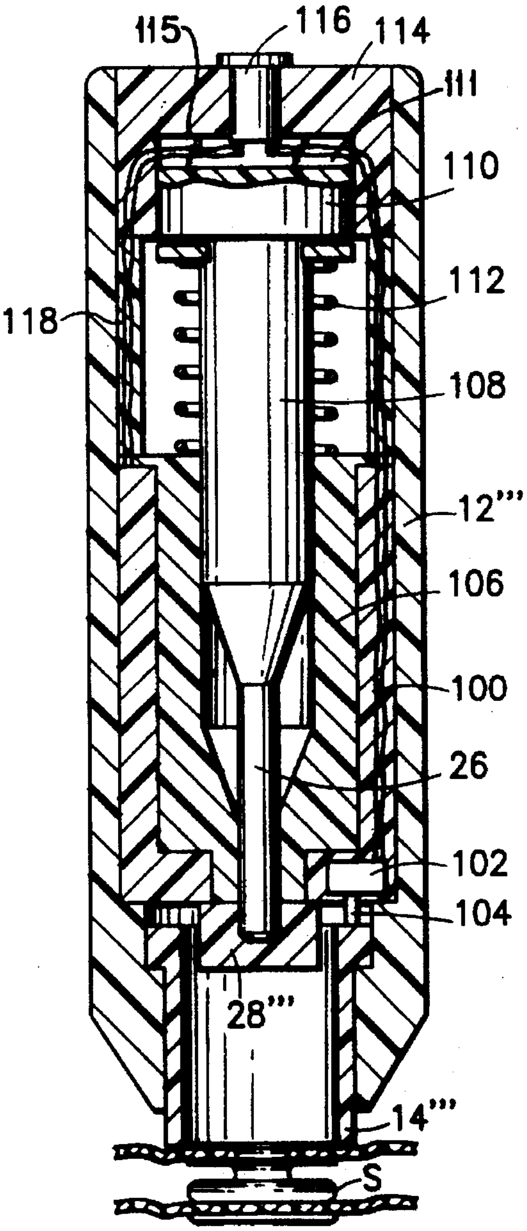
FIG. 10 is a view similar to FIG. 4 of a further modified form of the invention.
Figure 11:
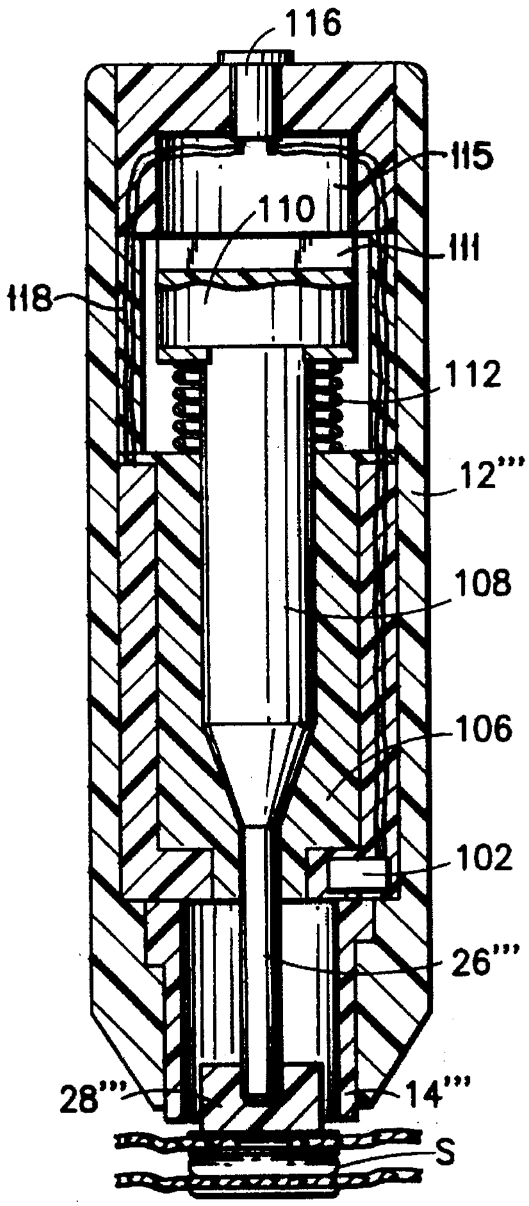
FIG. 11 is a view similar to FIG. 5 of a further modified form of the invention.

A still further modification of the closer heretofore described is illustrated in FIGS. 10 and 11. In this version the seal 12''' reciprocably mounts at its front end the annular trigger 14'''. Inside the shell 12''' an annular spacer 100 supports a switch 102 having a downwardly biased actuator 104. Disposed inside the spacing sleeve 100 is a solenoid winding 106 shown schematically.

The winding is annular and receives a reciprocable armature 108 having a head 110 at its upper end. A slot 111 is formed in the upper end of the head. A return spring 112 encircles the armature between the head and the winding 106. The lower end of the armature is reduced, is guided by the funnel-shaped lower end of winding 106 and receives an impact head 28'''. Disposed in the upper end of the shell 12''' is the plug 114 having an upward cavity 115 therein slidably receiving the head 110. An electric connector 116 is mounted centrally of the plug 114 and suitable wiring (not shown), understood by those skilled in the art, connects the two terminals of the connector 116, the solenoid winding 106 and the switch 102 in series. The connector 116 is linked by a cable (not shown) to power means.

By virtue of this structure, the impact head 28''' is normally up (FIG. 10), the slot 111 accommodating the connector When the trigger 14''' is positioned over the fastener S and the housing 12''' is lightly lowered, the trigger 14" will raise relative to the housing moving the actuator 104 up and activating the winding 106. This slams down the armature 108 and the impact head 28" to close the fastener S.

Still further variations in the structure of the closer are. contemplated. Thus, while the invention is shown in a limited number of forms and embodiments, it is limited only by the following claim language which may be extended by an enlargement of the right to exclude as is appropriate under the doctrine of equivalents.

What is claimed is:

1. A hand-held snap fastener closer comprising:

a. a cylindrical housing defined by a front end and a rear end and formed with an axial bore having an enlargement in the front end, b. a drive mounted fixedly in the bore and having an axial drive shaft reciprocable therein, extending toward the front end and terminating in an impact head normally in an inward position, c. an annular trigger reciprocably disposed in the enlargement and loosely surrounding the impact head and normally in an outward position extending beyond the front end of the housing, and moveable to an inward position, and d. an actuator in the housing moved by the trigger in its inward position to activate the drive which drives the head outward.

2. A snap fastener closer as claimed in claim 1 wherein the drive is a piston/cylinder assembly having a connecting rod and the connecting rod is the drive shaft.

3. A snap fastener closer as claimed in claim 2 wherein the actuator comprises an elongate rod reciprocably disposed in the housing offset from the axis and a valve disposed in an air supply line to the assembly, and the rod may be pushed at its front end by the trigger and its rear end will change the condition of the valve.

4. A snap fastener closer as claimed in claim 3 wherein the valve is disposed cantedly in the housing and the rear end of the elongate rod is formed with an inclined surface.

5. A snap fastener closer as claimed in claim 2 wherein the piston/cylinder assembly includes a return spring.

6. A snap fastener closer as claimed in claim 2 wherein the bore snugly receives the piston/cylinder assembly and the bore is reduced in diameter at the end of the assembly adjacent to the front end to define an annular shoulder against which the assembly butts.

7. A snap fastener closer as claimed in claim 1 wherein the housing comprises a tubular shell and a cylindrical body.

8. A snap fastener closer as claimed in claim 1 wherein the housing is provided with a spring to urge the annular trigger to its normal position.

9. A snap fastener closer as claimed in claim 8 wherein the spring comprises a plurality of spring-pressed pins.

10. A snap fastener closer as claimed in claim 1 wherein the trigger is bevelled on its inside edge at the front end.

11. A snap fastener closer as claimed in claim 1 wherein the drive is a solenoid having an armature and the armature is the drive shaft.

12. A method of closing a snap fastener having mating male and female snap fastener parts, the method comprising a. axially aligning the snap fastener parts in preparation for mating one on top of another on a solid surface, b. placing over the aligned parts an axially reciprocable head having a drive, the head being surrounded by an annular trigger for the drive, c. circumposing the parts with the annular trigger, and d. moving the drive toward the parts to depress the trigger and thereby drive down the head to close the fastener.

13. In combination:

a snap fastener having male and female parts aligned one over the other in pre-mating condition resting on a solid surface; and a snap fastener closer comprising:

a. a cylindrical housing defined by a front end and a rear end and formed with an axial bore having an enlargement in the front end, b. a drive mounted fixedly in the bore and having an axial drive shaft reciprocable therein, extending toward the front end and terminating in an impact head normally in an inward position, c. an annular trigger reciprocably disposed in the enlargement and loosely surrounding the impact head and the snap fastener parts and normally in an outward position extending beyond the front end of the housing, and moveable to an inward position and d. an actuator in the housing moved by the trigger in its inward position to activate the drive which drives the impact head outward to impact on the fastener parts to close the fastener.

14. The combination as claimed in claim 13 wherein the drive is a piston/cylinder assembly having a connecting rod and the connecting rod is the drive shaft.

15. The combination as claimed in claim 14 wherein the actuator comprises an elongate rod reciprocably disposed in the housing offset from the axis and a valve disposed in an air supply line to the assembly, and the rod may be pushed at its front end by the trigger and its rear end will change the condition of the valve.

16. The combination as claimed in claim 15 wherein the valve is disposed cantedly in the housing and the rear end of the rod is formed with an inclined surface.

17. The combination as claimed in claim 14 wherein the piston/cylinder assembly includes a return spring.

18. The combination as claimed in claim 14 wherein the bore snugly receives the piston/cylinder assembly and the bore is reduced in diameter at the end of the assembly adjacent to the front end to define an annular shoulder against which the assembly butts.

19. The combination as claimed in claim 13 wherein the housing comprises a tubular shell and a cylindrical body.

20. The combination as claimed in claim 13 wherein the housing is provided with a spring to urge the annular trigger to its normal position.

21. The combination as claimed in claim 20 wherein the spring comprises a plurality of spring-pressed pins.

22. The combination as claimed in claim 13 wherein the trigger is bevelled on its inside edge at the front end.

23. The combination as claimed in claim 13 wherein the drive is a solenoid having an armature and the armature is the drive shaft.

* * * * *